(12) United States Patent
Steinberg et al.

(10) Patent No.: US 6,628,325 B1
(45) Date of Patent: *Sep. 30, 2003

(54) CAMERA NETWORK COMMUNICATION DEVICE

(75) Inventors: Eran Steinberg, San Francisco, CA (US); Yury Prilutsky, San Mateo, CA (US); Scott Neil Rafer, San Francisco, CA (US)

(73) Assignee: Fotonation Holdings, LLC, Peterborough, NH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,594

(22) Filed: Jun. 26, 1998

(51) Int. Cl.[7] .............................................. H04N 5/232
(52) U.S. Cl. ............................... 348/211.1; 348/211.4; 348/211.6; 348/552; 348/207.1
(58) Field of Search ................................ 348/231, 232, 348/233, 552, 211, 14.08, 14.14, 14.09, 14.01, 14.02, 14.04, 231.99, 231.2, 231.3, 207.1, 207.11, 211.99, 211.1, 211.2, 211.3, 211.4, 211.6, 211.11, 211.12, 211.13; 380/10

(56) References Cited

U.S. PATENT DOCUMENTS

| | | | | |
|---|---|---|---|---|
| 5,444,483 A | | 8/1995 | Maeda ........................ 348/231 |
| 5,446,491 A | * | 8/1995 | Shibata et al. ................. 348/15 |
| 5,475,441 A | | 12/1995 | Parulski et al. ............... 348/552 |
| 5,477,264 A | * | 12/1995 | Sarbadhikari et al. ....... 348/231 |
| 5,477,542 A | * | 12/1995 | Takahara et al. .............. 348/14 |
| 5,524,194 A | * | 6/1996 | Chida et al. ................. 348/232 |
| 5,568,192 A | * | 10/1996 | Hannah ........................ 348/222 |
| 5,594,736 A | * | 1/1997 | Tatsumi et al. .............. 348/232 |
| 5,625,410 A | * | 4/1997 | Washino et al. ............. 348/552 |
| 5,674,003 A | * | 10/1997 | Andersen et al. ......... 364/514 R |
| 5,696,850 A | * | 12/1997 | Parulski et al. ............. 348/232 |
| 5,754,227 A | * | 5/1998 | Fukuoka ..................... 348/232 |
| 5,814,798 A | * | 9/1998 | Zancho ....................... 235/380 |
| 5,825,408 A | * | 10/1998 | Yuyama et al. .......... 348/14.01 |
| 5,835,140 A | * | 11/1998 | Nakamura et al. ........... 348/211 |
| 5,852,472 A | * | 12/1998 | Prasad et al. ................ 348/552 |
| 5,862,217 A | * | 1/1999 | Steinberg et al. ............ 348/231 |
| 5,862,218 A | * | 1/1999 | Steinberg .................... 348/231 |
| 5,862,325 A | * | 1/1999 | Reed et al. ............. 395/200.31 |
| 5,896,128 A | * | 4/1999 | Boyer .......................... 348/15 |
| 5,905,528 A | * | 5/1999 | Kodama ..................... 348/231 |
| 5,943,046 A | * | 8/1999 | Cave et al. .................. 348/552 |
| 6,002,770 A | * | 12/1999 | Tomko et al. ................. 380/44 |
| 6,046,762 A | * | 4/2000 | Sonesh et al. ................ 348/16 |
| 6,049,621 A | * | 4/2000 | Jain et al. .................... 382/125 |
| 6,073,192 A | * | 6/2000 | Clapp et al. ................. 348/552 |
| 2001/0010543 A1 | * | 8/2001 | Ward et al. | |

* cited by examiner

Primary Examiner—Wendy R. Garber
Assistant Examiner—Jacqueline Wilson
(74) Attorney, Agent, or Firm—Sawyer Law Group LLP

(57) ABSTRACT

A communication device for interconnecting a digital camera to a communication network for downloading data to a remote computer. The device has a network communication port for establishing communication with a network via a pre-defined protocol and communication mode, and has a camera communication port such as a serial, parallel, SCSI, USB or Irda-port that imitates the back end application of a PC, for connection to a digital camera for sending and receiving data to and from the camera. The camera communication port is also used for input of programming and setup data to the communication device from a PC. The device can be programmed to operate on the data directly, such as in the case of data for storage or operational direction, and/or direct the data to the camera. The device may also have a Smart card socket into which a user can insert a card to input data, such as user and camera I.D., user authorization, image marking, camera operational parameter, remote computer/destination address, etc. The device can be programmed to perform encryption, authentication, watermarking and fingerprinting procedures, as well as structuring the data for transmission over a particular network, and to automatically perform operation, such as at specific times or in response to data input.

3 Claims, 15 Drawing Sheets

DEVICE CONNECTION TO
NETWORK
- Telephony (modem) connection
- Ethernet connection
- Router
- Hub
- Infra-Red connection
- Cellular connection
- Unlicensed wireless frequencies
- Satellite communication Etc.

DEVICE TO NETWORK
PROTOCALLS
- TCP/IP
- Mail Client
- CORBA/IIOP
- X-Modem
- Z-Modem Etc.

DEVICE INFORMATION RE
CAMERA
- Camera serial number
- User name
- Date and Time of transmission Etc.

DEVICE INFORMATION
FROM CAMERA
- Images
- Voice Annotation
- Overlay annotation
- Date and time of capture
- User name of photographer Etc.

DEVICE INFORMATION RE
DESTINATION
- Phone number
- IP address
- User account name
- User login
- User Password Etc.

OPERATIONAL INFORMATION FOR
DEVICE AND/OR CAMERA
- Phone number to call
- IP address
- Operation to be performed on images
- Password (e.g. public key password)

Etc.

DEVICE GENERATED INFORMATION
- Unique device ID
- Time and date
- Number of images processed/received INSTRUCTION TO CAMERA FROM
DEVICE
- Live image
- Take image
- Delete images
- Change camera resolution
- Change file format
- Turn flash on/off
- Remote focus
- White Balance
- Application of digital filtering on the images while capturing the images
- Remote optical zooming
- Remote optical exposure (change f-stop, bracket image exposure time etc.)
- Remote digital exposure (change gain, offset, CCD exposure time etc.)
- Digital Zooming
- Selection of ROI (e.g. for digital zooming, image processing, filtering etc.)

Etc.

Fig. 7

DEVICE OPERATIONS ON IMAGE DATA

Adding identifiers to the images such as:
- Stamping the date and time on the image
- Adding the users name
- Adding camera Unique ID
- Adding an image Unique ID
- Adding the time and date of transmission Securing the images via:
- Watermarking images
- Authenticating images
- Encryption images Operating on the files:
- Compressing/expanding files
- Parsing files and converting to different formats Performing image enhancement operations such as:
- Automatic color correction
- Resampling
- Sharpening
- Rotation
- Generic image filtering Etc.

Fig. 8

Data From Destination to Device

1. Take a picture at a set time or at intervals
2. For image header, etc.
    a) account ID
    b) title
    c) name, address, etc.
3. Operational data
    a) where to take a picture
    b) map of location
    c) corrective notices
4. Instruction to download data Data Processing by Destination 1. Encrypt and store data
2. Decrypt data and print image
3. Archive the image
4. Send image data to remote location
5. Place image data on the web
6. Send data by e-mail with low resolution of image
7. Send decrypted image to a first destination
8. Send authentication data to a second destination
9. Compare questionable image data from a third source with authentication data and display the result

FIG 16

CAMERA NETWORK COMMUNICATION DEVICE

BACKGROUND OF THE INVENTION

1. Field of the Invention

The present invention relates generally to digital still and video cameras and communication systems, and more particularly to a communication device providing a communication interface between a digital camera and a network system.

2. Brief Description of the Prior Art

Portable digital cameras are generally treated as PC peripheral devices. With conventional digital cameras, a user takes pictures until the camera memory/disk is filled and then downloads the digital image data to a PC. The camera needs to be either connected to the PC, for example through a cable, or a removable storage device such as a PCMCIA card must be manually transferred from the camera to the PC. The need to regularly make a direct, physical connection to a PC reduces the portable nature of digital cameras. In addition, downloading images to a PC is a local operation. In order to move, images into the internet, the user must apply another set of commands on the local PC. Such a system is described in U.S. Pat. No. 5,475,441 by Parulski et al. Cameras are also incorporated into integrated systems for displaying an image, such as a visual surveillance system in a retail store. U.S. Pat. No. 5,444,483 by Maeda discloses a system including a digital camera with processing circuitry for display on a television screen.

Another limitation of conventional digital cameras is that there is no direct way to identify an image once it is loaded onto the PC. Additional information must be added manually, such as operator name, account number, camera of origin, etc. Also, there is no way of securing the images to assure that an operator does not alter them once loaded into a PC, or that the images will not be viewed by an unauthorized person as part of the transmission of the images from the PC to a remote location.

SUMMARY OF THE INVENTION

It is therefore an object of the present invention to provide an apparatus to serve as an interface for enabling a user of a portable still and or video digital camera to send image data directly from the camera to a communication network for transmission and downloading to a remote network location or remote computer.

It is a further object of the present invention to provide an apparatus enabling a user of a conventional digital camera designed to only download directly to a PC, to send camera data directly from the camera to a communication network for transmission and downloading to a remote network location or remote computer.

It is a still further object of the present invention to provide an apparatus that performs operations to secure the camera data against unauthorized use during transmission through an insecure communications network, and storage in an otherwise unsecure remote destination.

It is a still further object of the present invention to provide an apparatus for downloading image data from a variety of digital cameras to a remote computer through a selected communication network by means of an interface selected from a group, including but not limited to a modem, an ethernet adapter, a router, a hub, or infrared and other wireless connection.

It is another object of the present invention to provide an apparatus that can receive and encrypt and/or mark image data from a camera and transmit the encrypted/marked data to a remote computer.

It is another object of the present invention to provide an apparatus that can receive image data from a camera and transmit the data to a remote computer along with additional annotation data including but not limited to time and date, user information, location information, and camera information.

It is an object of the present invention to provide an apparatus for connecting a digital camera output to a remote computer, the apparatus being responsive to a Smart Card to program the apparatus and the camera, and to allow an authorized user to operate the apparatus.

It is another object of the present invention to provide an apparatus for use with a digital camera, that can control the camera by means of programming, or in response to information/direction from a remote computerized destination.

It is another objective of the present invention to provide an apparatus for use with a digital camera, that can be programmed by a PC using the same interface on the apparatus that would later be used to communicate with the camera.

It is a still further objective of the present invention to provide a still and or video digital camera capable of downloading image data to a remote computer through a selected communication network by means of an interface selected from the group including but not limited to a modem, an ethernet adapter, a router, a hub, or infrared or other wireless connection.

It is another objective of the present invention to provide a digital camera, and a device for use with a digital camera, that automatically performs operations dependent on camera or device programming, or in response to information/direction from a remote computerized destination.

Briefly, a preferred embodiment of the present invention includes a communication device for interconnecting a digital camera to a communication network for downloading data to a remote computer. The device has a network communication port for establishing communication with a network via a pre-defined protocol and communication mode, and has a camera communication port such as a serial, parallel, SCSI, USB or Irda-port that imitates the back end application of a PC, for connection to a digital camera for sending and receiving data to and from the camera. The camera communication port is also used for input of programming and setup data to the communication device from a PC. The device can be programmed to operate on the data directly, such as in the case of data for storage or operational direction, and/or direct the data to the camera. The device may also have a Smart card socket into which a user can insert a card to input data, such as user and camera I.D., user authorization, image marking, camera operational parameters, remote computer/destination address, etc. The device can be programmed to perform encryption, authentication, watermarking and fingerprinting procedures, as well as structuring the data for transmission over a particular network, and to automatically perform operations, such as at specific times or in response to data input.

An advantage of the present invention is that a digital camera user can download image camera data to a remote computer or network site and therefore avoid the concern of the need to connect the camera or its removable device to a local computer in order to perform such operation.

Another advantage of the present invention is that it gives the camera user the capability of automatically securing the camera data, for example by encrypting or marking the data prior to sending it over a communication system and downloading it to a computer.

Another advantage of the present invention is that it adds functionality to cameras that are not designed specifically to perform the task of connection to a remote network.

A further advantage of the present invention is that it provides an apparatus with a connection to a camera that is programmable for customized operations.

Another advantage of the present invention is that it provides an apparatus that enables a user to send data from a digital camera through a network to a plurality of destinations of a variety of types, such as network printers and remote archives.

IN THE DRAWING

Figure 6:
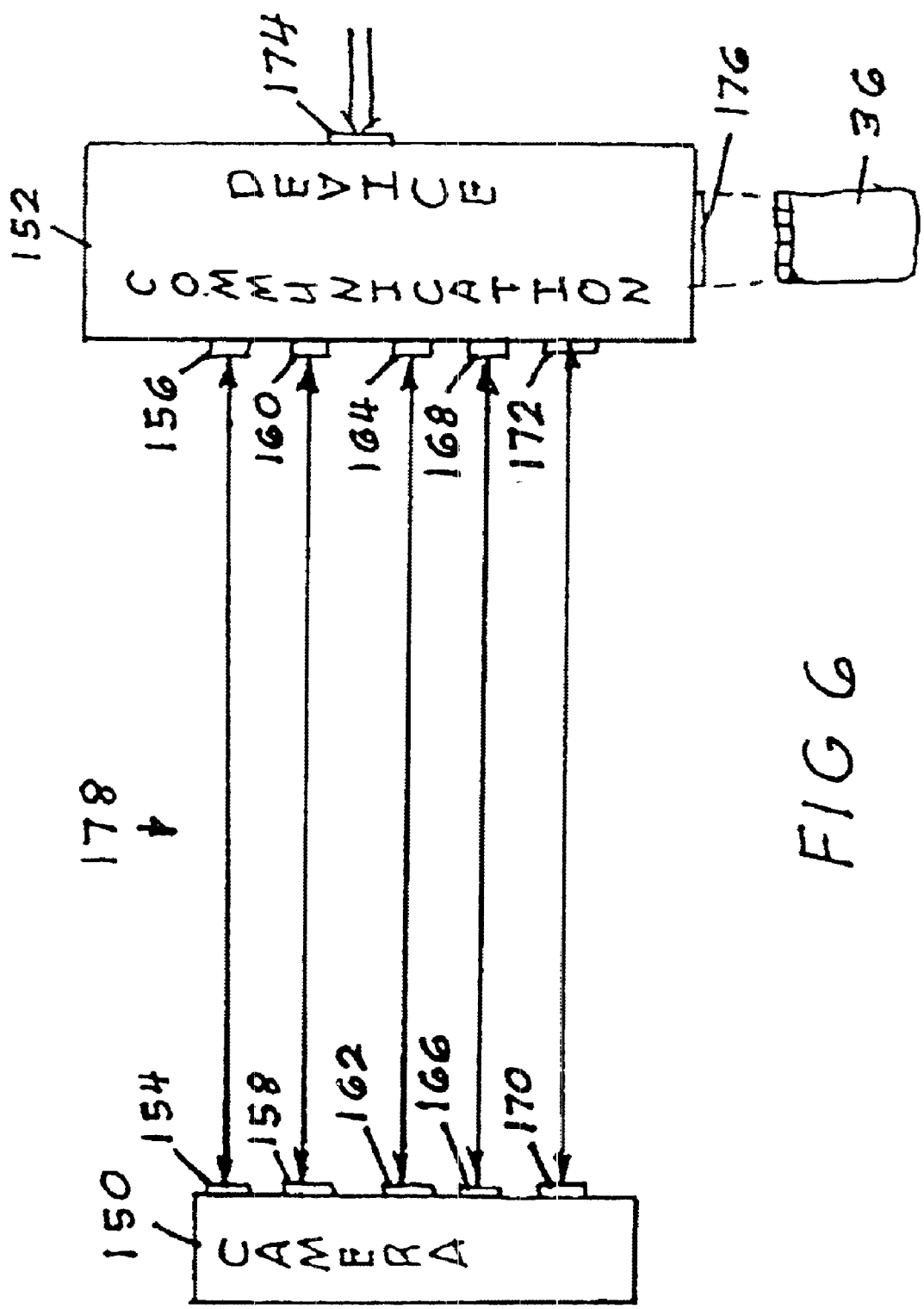
Figure 9:
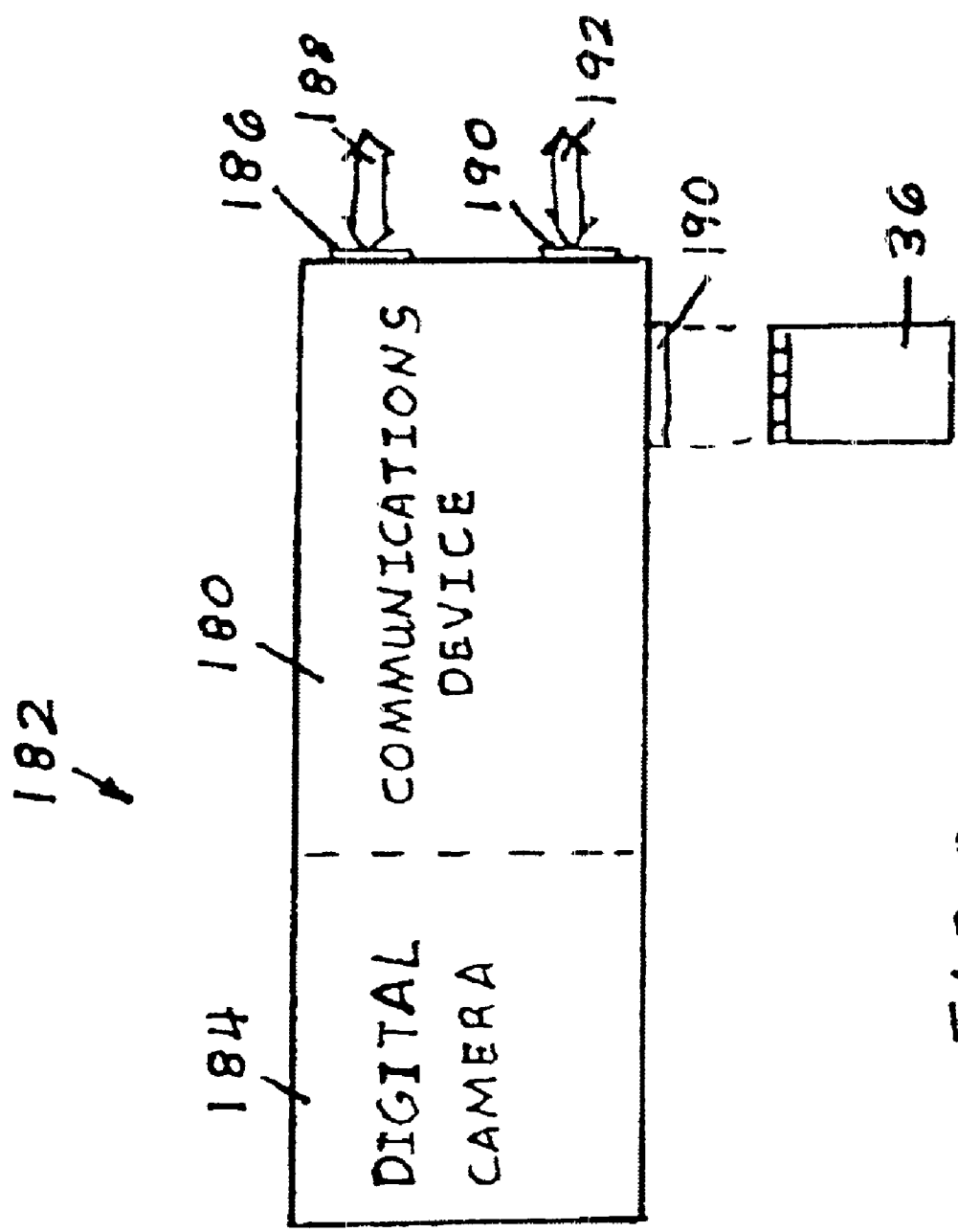
Figure 10:
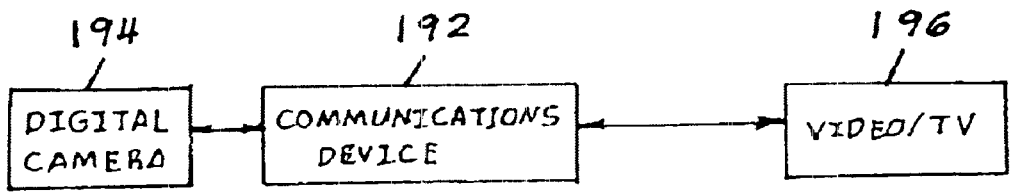
Figure 11:
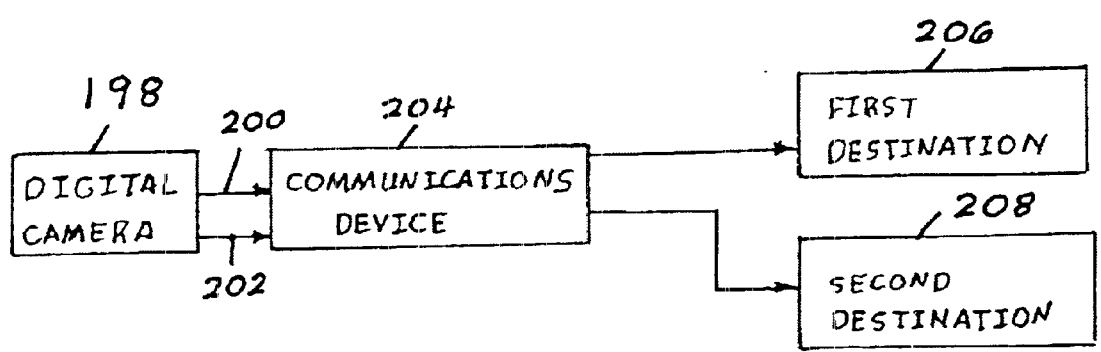
Figure 12:
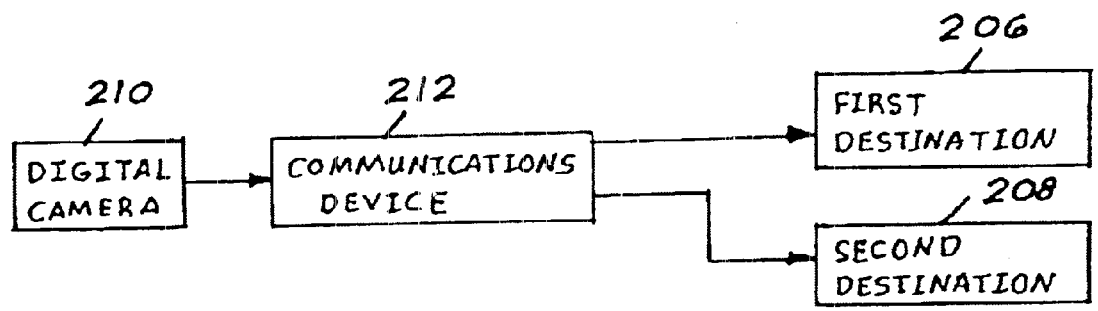

FIG. 6 demonstrates various ways of interconnecting the communication device to a camera;

FIG. 7 summarizes various programming and operational options;

FIG. 8 summarizes various operations that the communication device can perform on images;

FIG. 9 shows an alternate embodiment wherein the communication device is integrated with a camera;

FIG. 10 illustrates an embodiment of the present invention wherein a communication device is configured for connecting data from a camera directly to a video/TV receiver;

FIG. 11 illustrates a communication device configured for sending different data to separate destinations;

FIG. 12 illustrates a communication device configured for distinguishing two sets of data and sending one set to one location and another to a second location.

Figure 13:
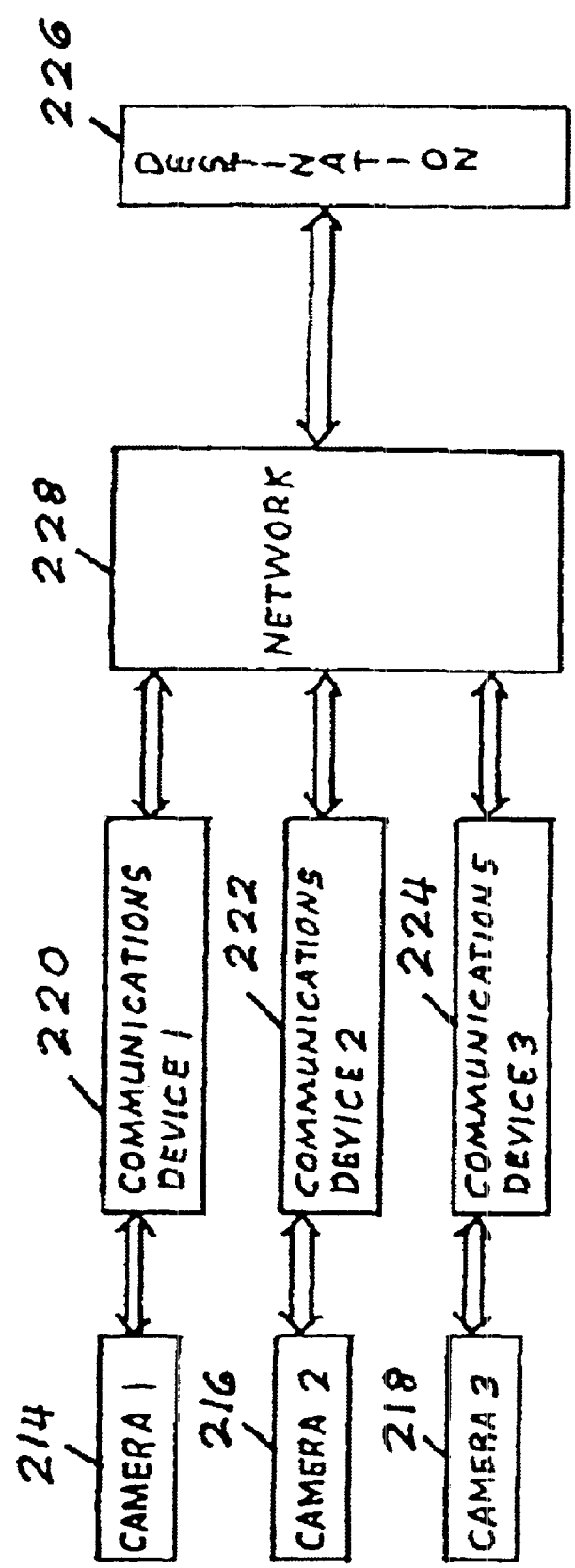
Figure 14:
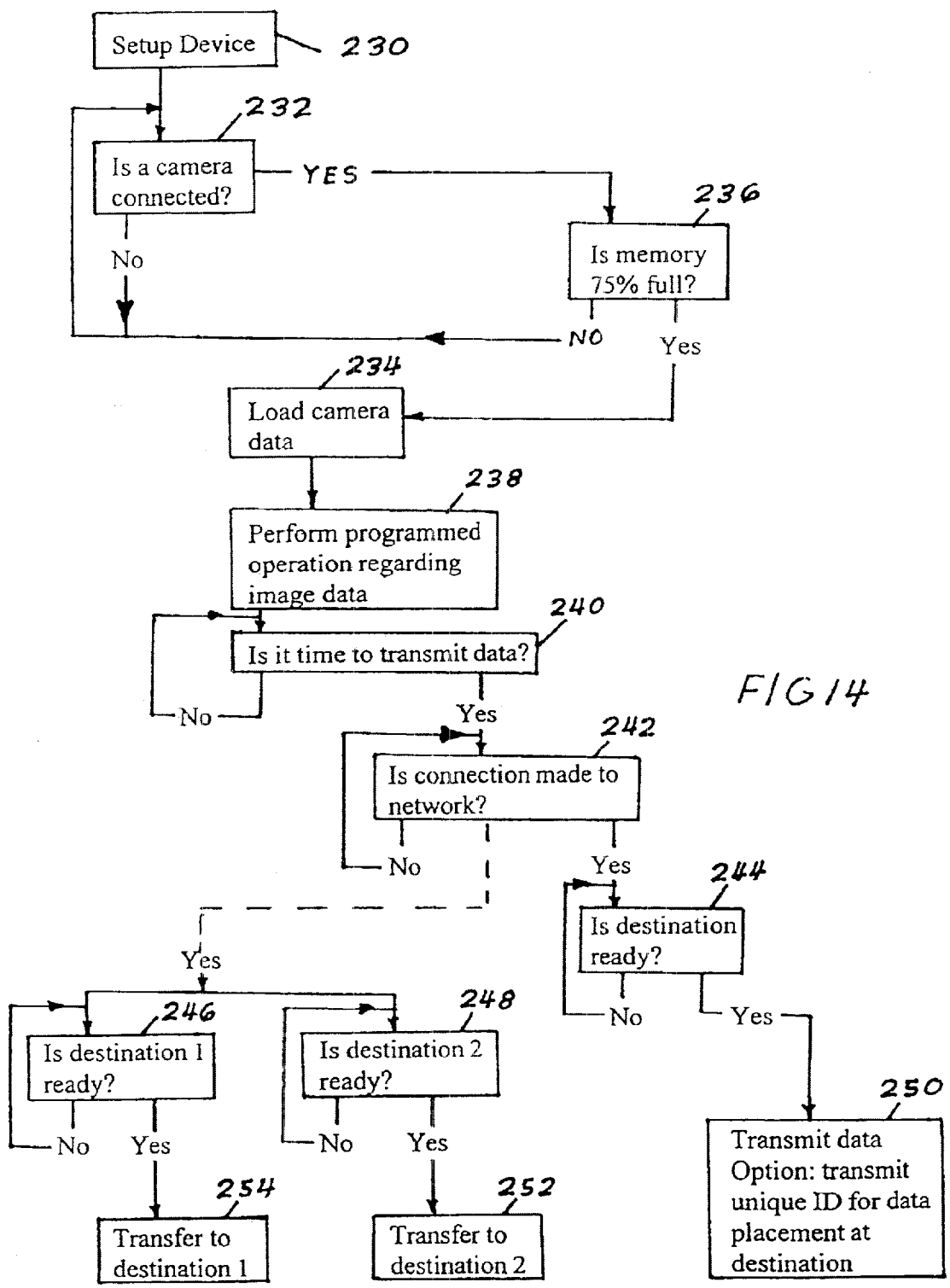
Figure 15:
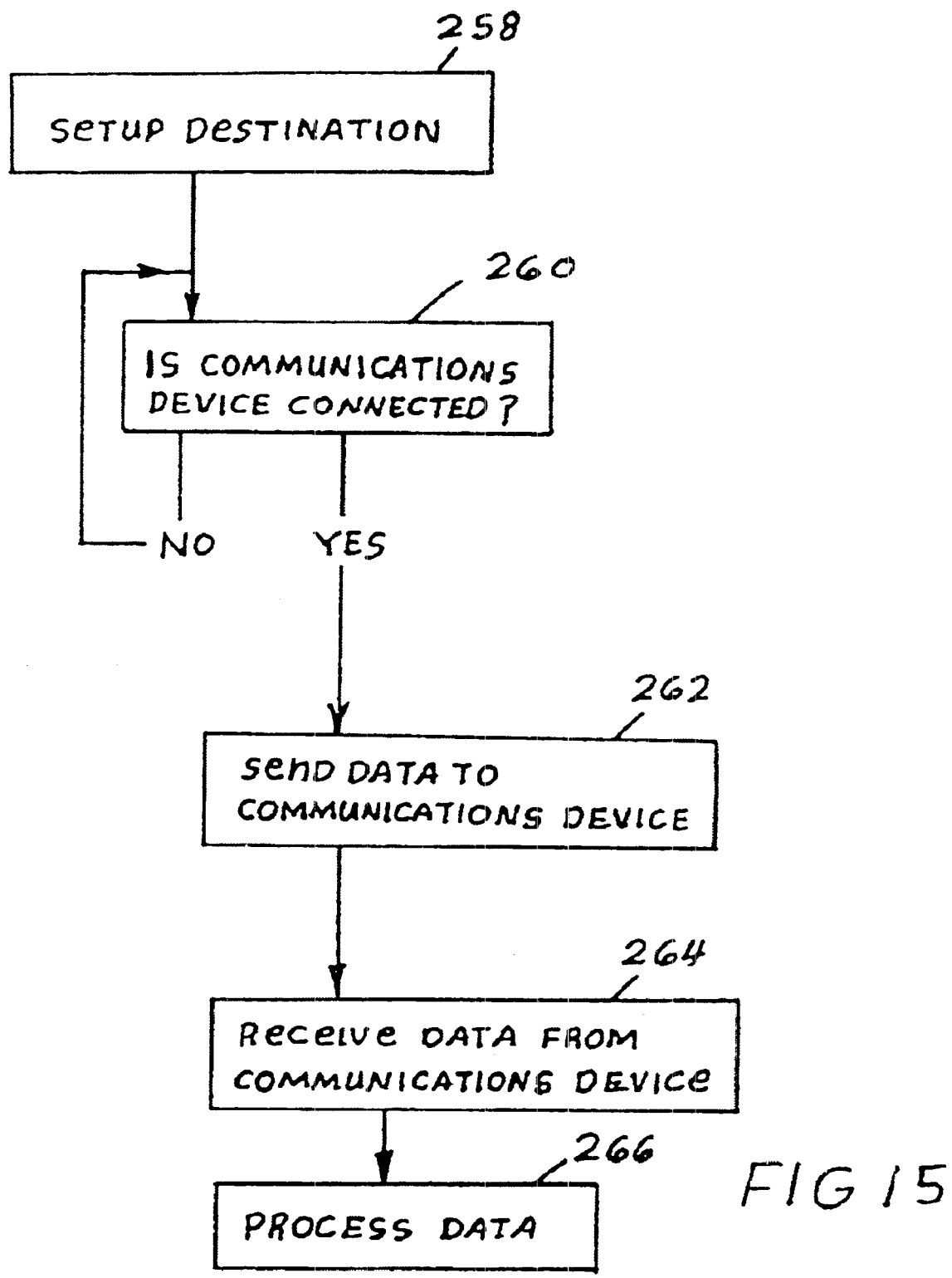
Figure 17:
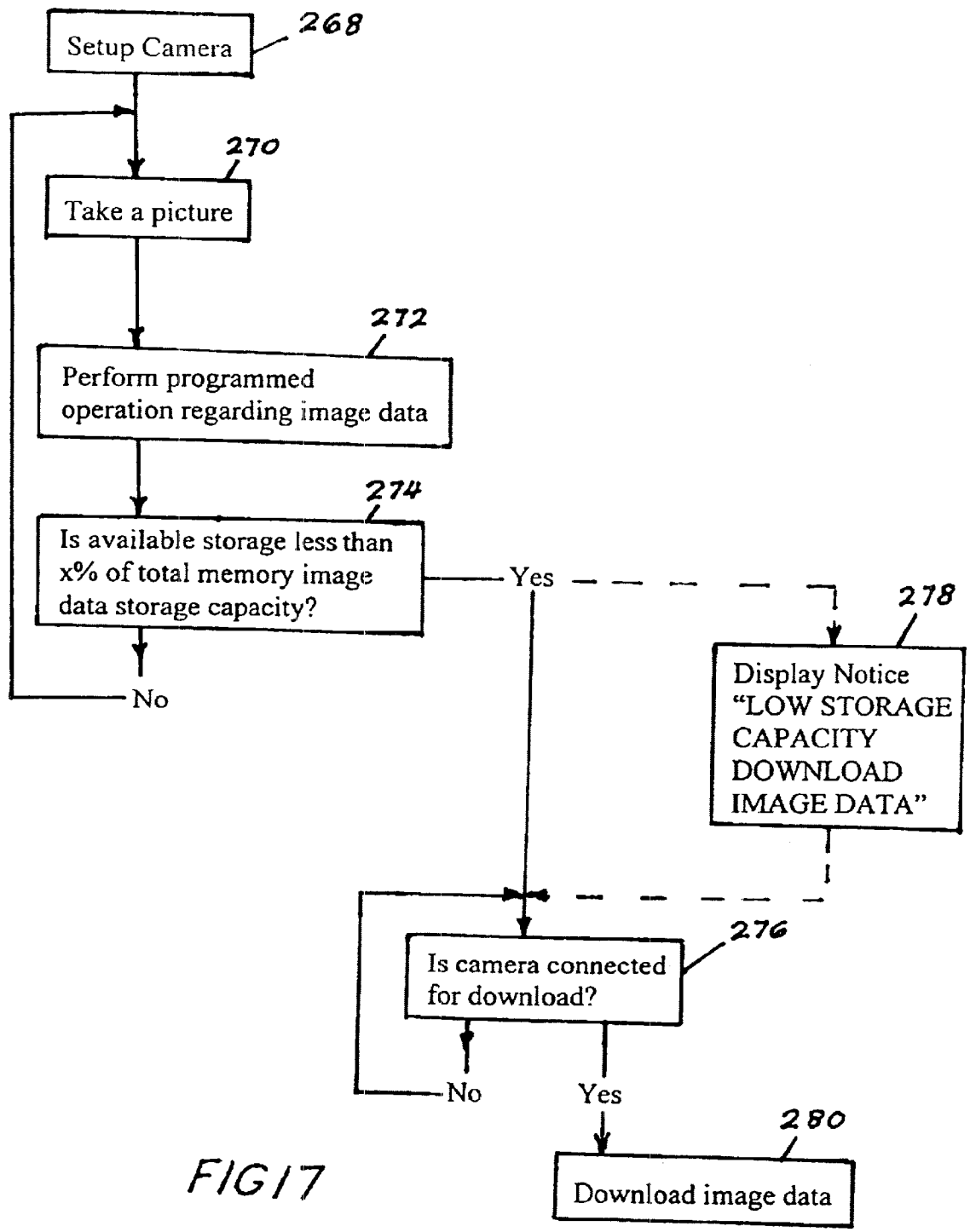

FIG. 13 illustrates a plurality of cameras each communicating through a communication device to a single destination;

FIG. 14 a flow chart illustrating automation related to the communication device;

FIG. 15 As a flow chart illustrating automation related to the destination device;

FIG. 16 presents summaries of types of data that can be sent from the destination to the communication device, and processing that can be done by the destination; and FIG. 17 is a flow chart illustrating automation in a camera having a built-in communication device.

DESCRIPTION OF THE PREFERRED EMBODIMENT

Figure 1:
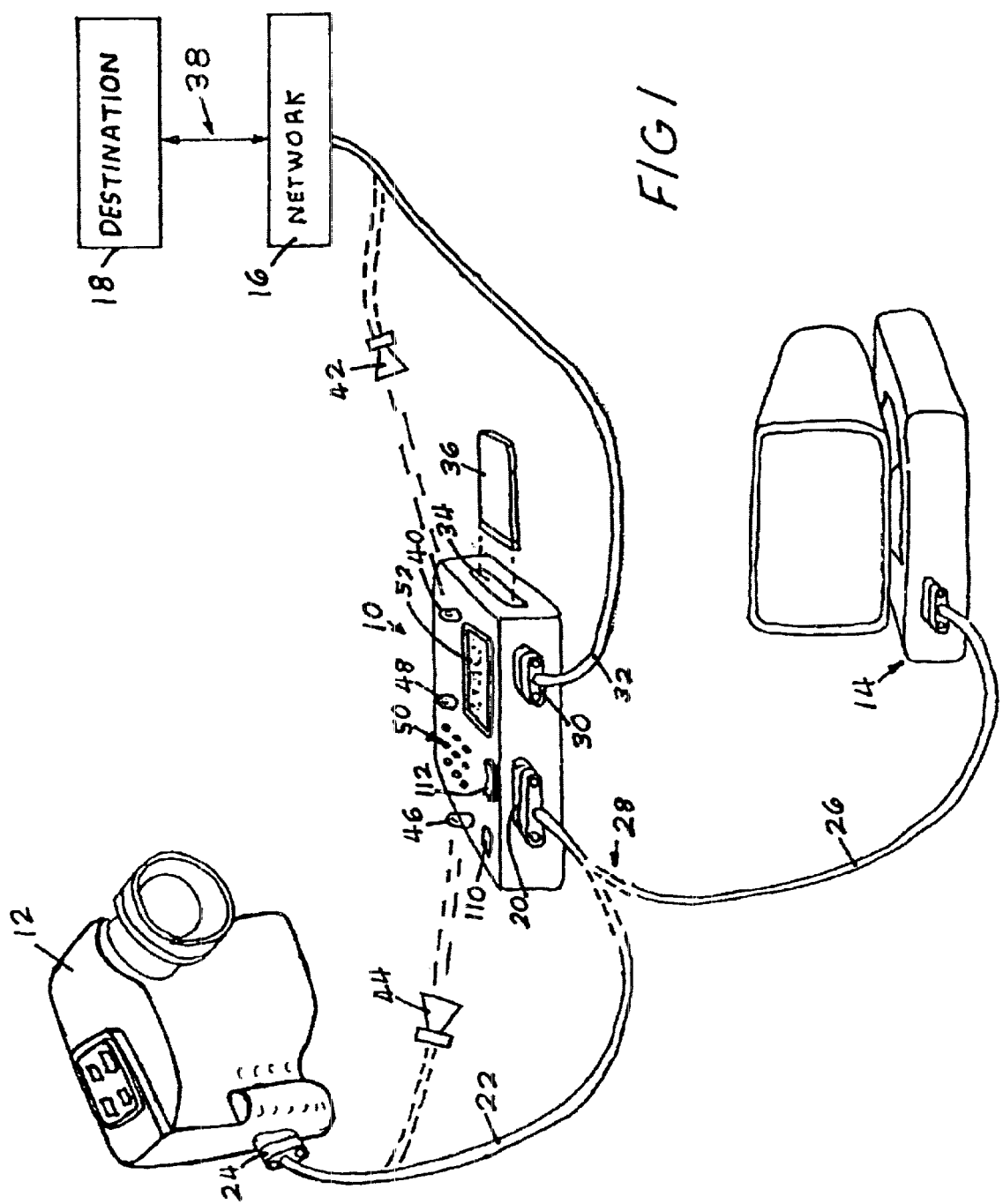
FIG. 1 illustrates the communication device of the present invention interconnected to a camera and communication network.

Referring now to FIG. 1 of the drawing, a preferred embodiment of the communication device 10 of the present invention is illustrated in use with a digital camera 12, PC 14, communication network 16 and a remote destination 18, which can be any type of network object, such as a PC, a printer, phone switch, server, etc. The device 10 has a camera communication port 20 for interconnection to either the camera 12 as indicated by cable 22 to port 24, or to the PC 14 through cable 26. The dashed lines 28 are to indicate that either the camera 12 or PC 14 can be connected to port 20. The device 10 has a network communication port 30 shown connected to the network 16 through line 32, and a Smart card port 34 for installation of a Smart card 36. The connection between the remote destination 18 to the network 16 is indicated by line 38. The communication device 10 includes any of various communication or network apparatus for sending data through the network 16.

The use of the communication device 10 involves first programming it as required. Programming is accomplished through use of a PC 14 connected to port 20 and/or through data entry from the Smart card 36 through the port 34 and/or from a remote computer at destination 18 by way of the network 16. Examples of programming options will be given in the following detailed description. Generally, the device 10 can be programmed to send instructions and data to the camera and to perform operations on data received from the camera, and to send data to the specified remote destination 18 by way of the network 16. Typical uses of the Smart card are for entry of additional data such as a user I.D., camera ID, an address or phone number of the remote destination/network site 18, operational instructions to the camera 12 and communication device 10, etc.

The primary function of the communication device 10 is to perform the necessary operations required to receive data from the camera 12 and then to send the data to the remote destination 18 by way of a selected communication media indicated by network 16. Other operations/functions will be described in the following specification.

The input 20 of the device 10 imitates the back end application of a PC, thus becoming transparent to the camera that operates as if it is communicating to a PC. The communication device 10 establishes communication with a network 16 via a predefined protocol and communication mode. The device 10 receives image data and other information data from a camera 12, and secures the data and structures it according to the required protocol, performs any other programmed operations, and then sends the data through the network for transmission to a destination device 18, such as a computer, printer, server, phone switch, etc., placing the data in assigned locations as defined by the device ID or commands. Communication between the device 10 and the destination device can be bi-directional, i.e. a destination device host 18 can download information to the communication device 10 as well as receive information. Any and all types of media are included in the spirit of the present invention. Particular embodiments of the communication device 10 include the functions of one or more devices including a telephone modem, ethernet adapter, a router, hub, etc. The device 10 can also be configured to transmit through a wireless communication link, such as satellite communication, etc. Signals include infrared, or any RF frequency such as UHF, VHF, or microwave.

In wireless communication between the device 10 and destination 18, line 32 is replaced with a wireless connection between the device 10 and the network 16, as indicated by antenna/emitter 40 on the communication device 10 and transceiver 42 connected to the network 16.

FIG. 1 also shows wireless communication between the camera 12 and communication device 10, indicated by a transceiver 44 connected to the camera port 24, and an antenna/emitter 46 on the communication device 10 for sending and receiving data between the camera 12 and device 10. All types of radiated signals are included in the spirit of the invention, the particular type depending on such factors as distance and environment, etc.

Because the device 10 is programmable, there is significant flexibility in its use. For example, device 10 can be programmed to perform functions automatically, for example to receive instruction from a destination device/host computer 18 to direct the camera to take a picture at a particular time of day, or every hour and/or to download images or upload information at a specific time from the camera. The device 10 can be programmed by a destination device 18 to operate a camera "off-line". After uploading the instruction to the device 10, the communication can be terminated. The device 10 can keep the instructions and send them to the camera appropriately.

In another example, the device 10 can be programmed to automatically connect to the network 16 when the camera image data storage is full, or partially full, and then to download the image data and subsequently disconnect from the network 16. Upon completion of downloading and receiving a confirmation from the destination 18, the device 10 can continue by deleting the image data from the camera.

The communication device 10, or camera if it is programmable, can also be loaded with information to accompany an image, and this information can be included, for example, in an image header. Examples of valuable information may include an account number and a camera ID. The device 10 can be programmed to automatically include this information with image data downloaded to a destination. Such identification avoids confusion as to the source of the image.

The communication device is designed with selected features permanently programmed. An alternate embodiment of the present invention includes permanent programming to allow downloading of data only to a specific destination. Such fixed programming helps avoid theft of the device or camera for a different use. In general, it is a specific feature of the present invention to provide a device with permanent programming for any specific purpose.

Another alternate embodiment includes fixed programming to automatically request and receive a camera ID from the destination device 18, and/or smart card 36 when connected to either of these. The camera ID is then included along with image data. A still further embodiment includes permanent programming to read and increment a counter and assign a unique number to each image received. In this way each image has associated with it a unique number, and the ID of the camera that secured the image. The programming for these functions will be understood by those skilled in the art, and is not shown. The required clock, counter, ROM and other necessary circuit components are illustrated in block form in FIG. 3. In an embodiment wherein the communication device is integrated with a digital camera, the camera ID is programmed into ROM, and therefore no additional request or receiving of a camera ID is required. The operation of including an image number is accomplished in the same manner as with the separate communication device. The integrated camera and communication device will be more fully described in the following text in reference to FIG. 9 of the drawing.

Other embodiments of the communication device 10 include the incorporation of visual 48 and sound 50 indicators to inform a user concerning operations that need to be accomplished. These can function either off or on line. For example, the alarm/sound indicator 50 can be programmed to sound, and/or the visual indicator can light if the device 10 is programmed to connect the camera to the network at a specific time and there is no connection. The indicators can also give notice when the image storage has reached a certain level. A visual display 52 is optional for presentation of useful information such as the remaining number of images to be sent to a destination 18, the remaining time required for transmission, notice of connection to a camera 12, and notice of connection to a destination 18. Internally, the device 10 includes a counter to maintain the image count for display as discussed above, and may optionally also include a clock for use in indicating the date and time of receiving an image on the display 52.

Figure 2:
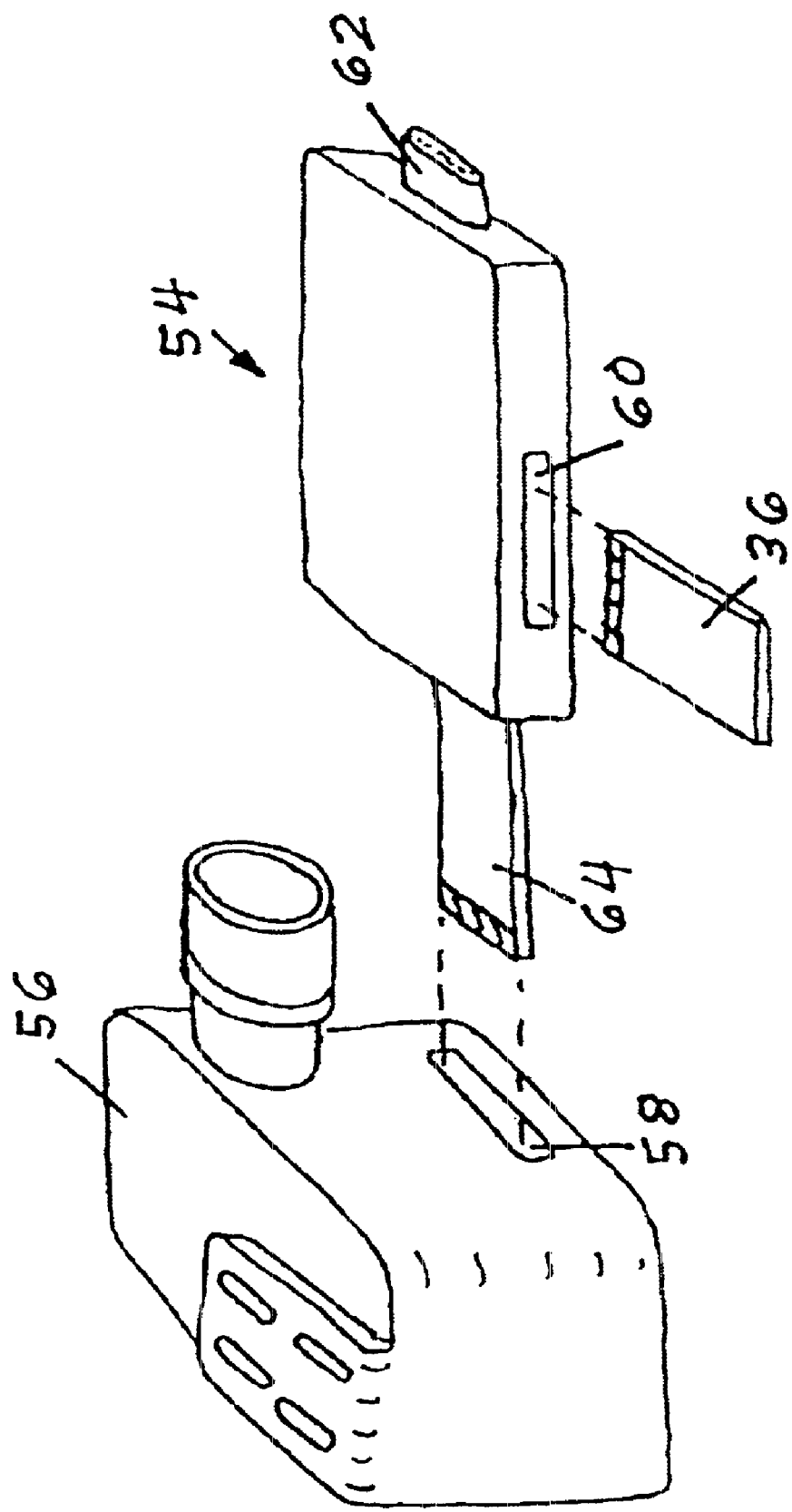
FIG. 2 Illustrates a device that connects to a camera through a removable card interface.

An alternate construction 54 of a device that is functionally similar to device 10 is shown in FIG. 2 wherein the connection from the device 54 to a camera 56, or to the PC 14 is made through a removable storage interface such as a PCMCIA card, Smart Media CompactFlash Clik! Card, etc. For example, a PCMCIA card 36 can be placed in the camera card slot 58 and camera data can be downloaded to the card 36. The card 36 can then be placed in the device 54 slot 60, and the camera data can be loaded into the device 54 for processing and transmission through connection 62 to a destination 20. An alternate embodiment is also indicated in FIG. 2, wherein a PCMCIA card extension 64 is provided for installation in the PCMCIA card slot 58 of the camera 56. Other configurations and types of connections in the design of the communication device will be apparent to those skilled in the art and these are to be included in the spirit of the present invention.

Figure 3:
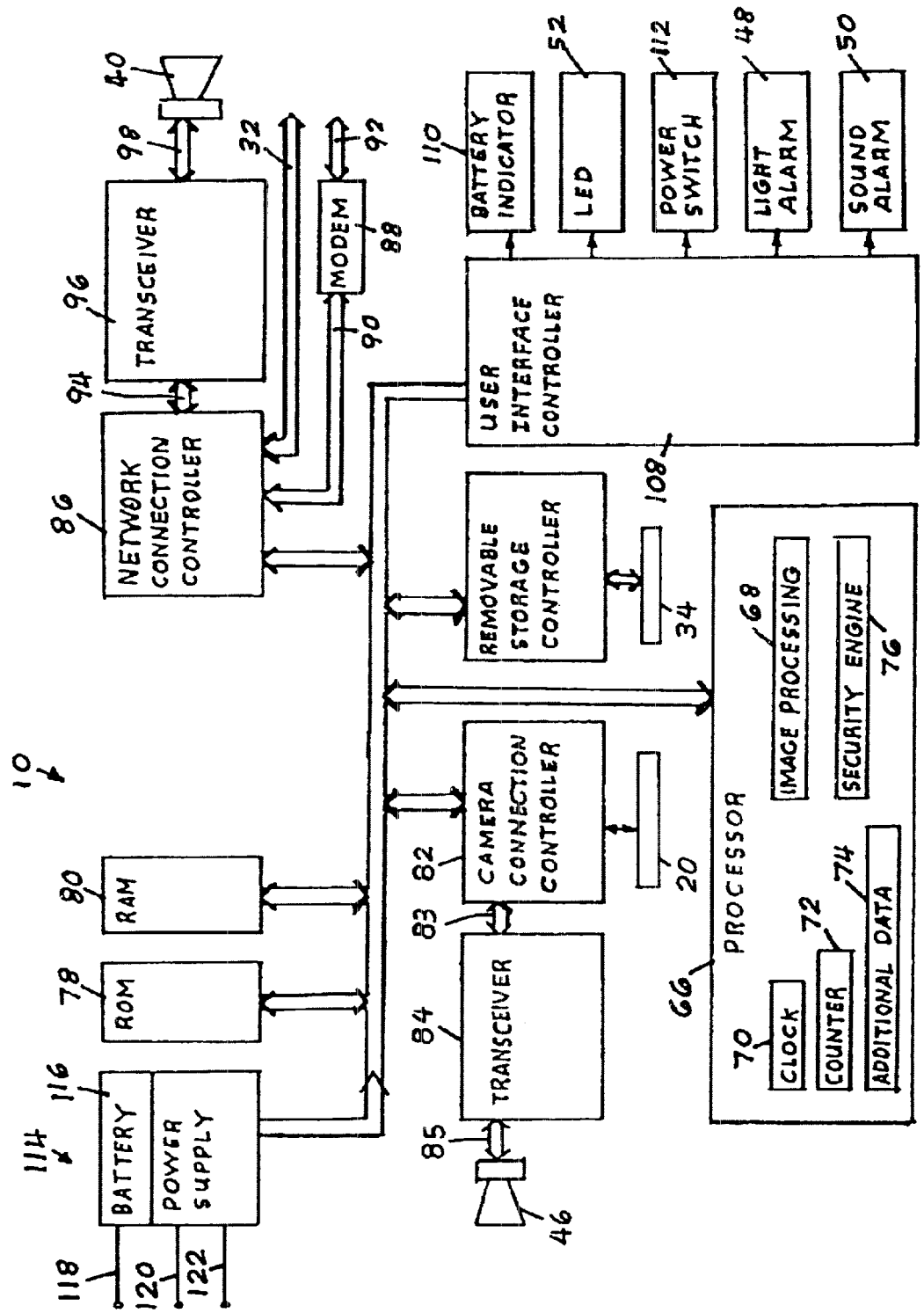
FIG. 3 is a block diagram of the communication device.

Referring to FIG. 3, the internal structure of the communication device 10 is shown in block form. A processor 66 performs operations according to specific programming generally indicated by the image processing block 68, and coordinates the activation of the communication device 10. Specifically noted in the processor block 66 are the operations of maintaining the time and date (clock 70), for inclusion with image data to indicate the time and date of the image processing. The processor also keeps an account of the number of images received and sent (block 72), for display on the LED screen 52, and processes additional data (block 74) for various purposes, including user data to be included with image data. In addition, the processor performs security operations when programmed to do so (block 76). Typically, a ROM 78 is provided to store permanently programmed data, and a RAM 80 is used for temporary storage. Specific camera communication apparatus includes a camera connection controller 82, and an optional infrared transceiver 84 for a wireless connection to the camera. The camera controller 82 connects to the camera through port 20 and/or the transceiver 84, and additional connective hardware as indicated in FIG. 1. The network communication apparatus similarly includes, in addition to the processor and memory blocks, a network connection controller 86, communicating with the network through line 32 and/or connected to a modem 88 through bus 90 and then to the network through a modem output bus 92 and/or a bus 94 to a transceiver 96 to the antenna/emitter 40 via a bus 98 for a wireless connection to the network. Similarly, the camera connection controller 82 is optionally connected via bus 83 to a transceiver 84 connected through bus 85 to antenna/emitter 46 for communication with the camera 12. The user indicators are operated through a user interface controller 108. The indicators include a battery condition indicator 110, the alarm light 48, the sound alarm 50, a power switch 112, and the LED display 52. The power supply 114 is also indicated with options including a battery 116, an AC battery charging supply input 118, a phone line power connection 120 and a line 122 from an alternate power bus, not shown.

Figure 4:
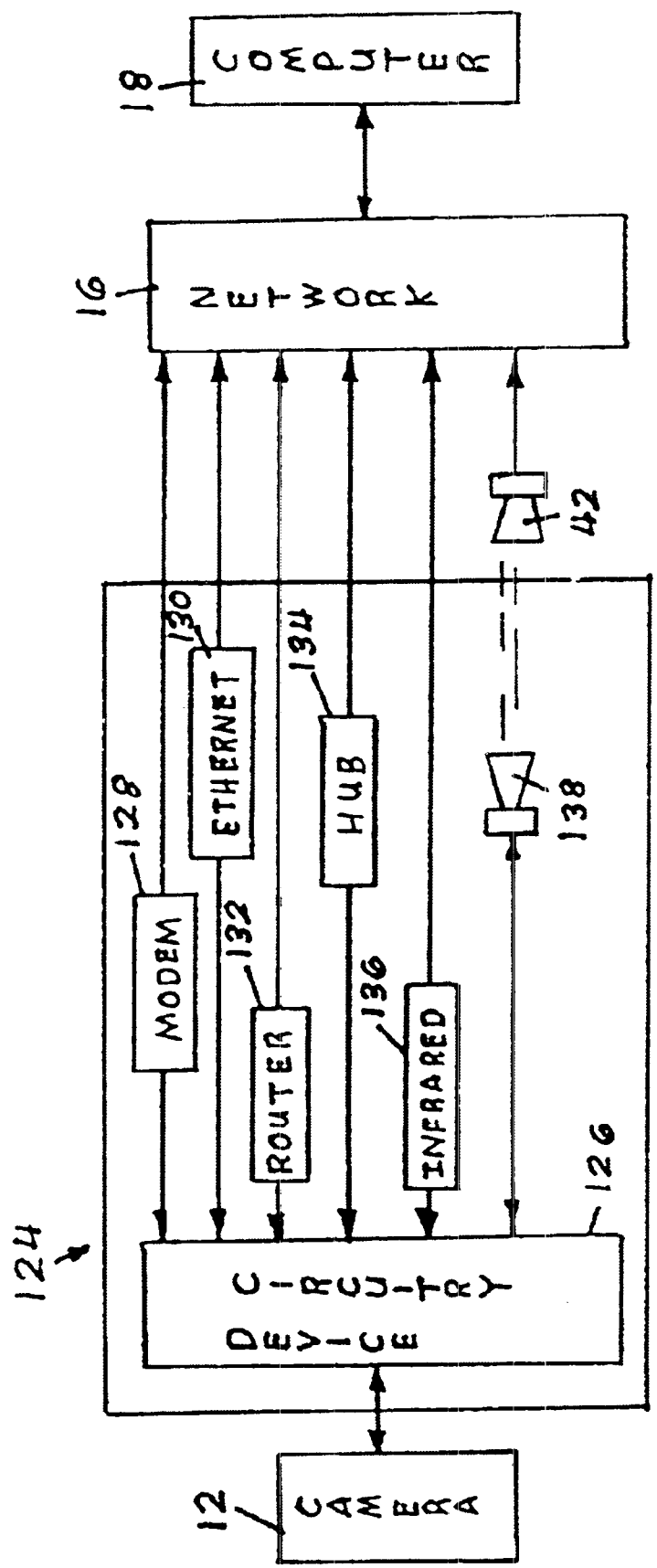
FIG. 4 illustrates the communication device connected to a network through one or more types of network connections.
Figure 5:
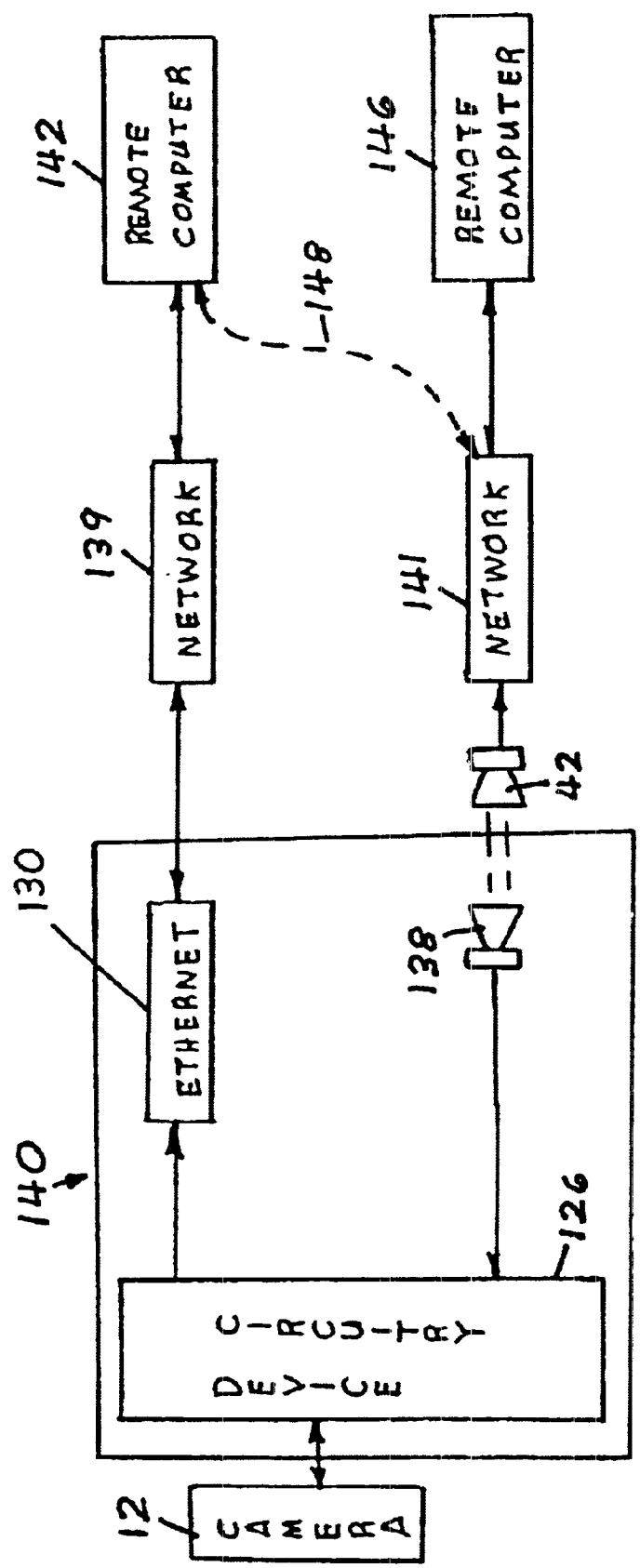
FIG. 5 illustrates a communication device connected to more than one network.

FIG. 4 illustrates accommodation of a number of types of network connections with a single communication device 124, including device circuitry 126 similar to that shown in FIG. 3, including a modem 128 and also an Ethernet adapter 130, a router 132, a hub 134, an infrared link 136 and/or any wireless connection 138. The device 124 can be configured to provide compatible data format for any one or more of the possible types of network connections, either individually or simultaneously. In the case of simultaneous output to more than one media, the device 124 includes a separate output for each type of connection. The various selected connection types can each transmit through a corresponding part of network 16 to a single computer or remote network node 18, or they can each output to a different remote destination, such as illustrated in FIG. 5 where output from a camera 12 is sent by a communication device 140 by way of an ethernet adapter 130 through a network 139 to a first remote computer 142, and also by way of a wireless connection/transceiver 138 to a transceiver 42, through a network 141 to a second remote computer 146, or alternately to the computer 142 as indicated by line 148.

The communication devices described in this disclosure can be connected to a camera by any of a variety of port types. This is illustrated in FIG. 6 showing a camera 150 connected to a communication device 152 by way of serial ports 154, 156, SCSI ports 158, 160, IrDa ports 162, 164, parallel ports 166, 168 and USB ports 170, 172 from communication device 152 to the camera 150. The device 152 can have any combination of outputs and other features as described for communication devices elsewhere in this disclosure. As shown, the device 152 has an output port 174 and an optional Smart card port 176 for use with a Smart card 36. The various interconnecting lines or media are simply noted as lines 178, each configured appropriately for the type of port. In the case of infrared communication the corresponding line 178 is not a physical communication cable but rather an unobstructed line of view. The camera and communication device can have one or more of the ports shown in FIG. 6. The spirit of the present invention includes other communication lines or media between the camera and communication device in addition to those shown in reference to FIG. 6, and between the communication device and a remote computer in addition to those illustrated in reference to FIG. 4. Such variations will be apparent to those skilled in the art.

As discussed above, the communication device of the present invention provides downloading of camera images onto computerized systems in an automated manner. The communication device is programmed to include information about the camera, the remote computer and intervening network and the corresponding method of transporting the information.

In addition to these more general features of the communication device, numerous programming and operational options are included in the spirit of the present invention, examples of which are given in the lists of FIG. 7. The types of connections from the communication device to a network were illustrated in detail in FIG. 4. These options are also listed in FIG. 7 under the heading "Device Connection to Network". Such connections require specific ordering/arranging of data known as Protocols. Typical protocols are listed in FIG. 7 under "Device to Network Protocols". A user will also often find it convenient to include the camera serial number or any other unique identification, along with the image information. Certain types of camera information are listed under "Device Information Re Camera", and this and other camera information are programmed into a device by use of the Smart card installed for example in port 34 of FIG. 1, or by use of a PC by way of port 20, or from a remote computer at 18 as illustrated in FIG. 1, or by other means that will be apparent to those skilled in the art.

In the same way, information regarding the identity by the particular communication device, and other information can be programmed into the device. Examples include a unique communication device ID, the date and time maintained by a built-in clock, the number of images stored and/or downloaded, and the numbers retained on a consecutive image counter in the communication device. These features are also listed in FIG. 7 under DEVICE GENERATED INFORMATION.

The communication device is also programmed with information concerning the destination 18, which normally will be a remote PC, but could be some other apparatus such as a video monitor or a printer, etc. This type of information is listed under "Device Information Re Destination" in FIG. 7.

Requiring a user password avoids the possibility that an unauthorized person will alter data. Phone number and IP address data can also be loaded into the communication device, and are listed under "Operational Information for Devices and/or Camera" in FIG. 7. Detailed examples of operations to be performed on images will be discussed in reference to FIG. 8.

The communication device programming also includes instructions that are then sent by the communication device to the camera, examples of which are listed in FIG. 7 under "Instruction to Camera From Device".

The purpose of the communication device is to receive information from the camera and then to store it, or modify it, and/or add to it according to the program and data, and send the required data to the network. Examples of data received from the camera are listed in FIG. 7 under "Device Information From Camera". Examples of operations performed on image data are included in the list of FIG. 8. A particular embodiment includes the device programmed to add identifiers to the image, such as including the date and time of image acquisition, the user's name, a unique camera I.D. or image I.D. and the date and time of transmission. This data can be placed on the image, or in an image header, or outside the image area. The communication device can also be programmed to mark, i.e. watermark or finger print, which are invisible marks, the images for the purpose of deterring unauthorized use, and/or it can be programmed to prepare image authentication data, or to encrypt the entire set of image data to prevent any unauthorized person from viewing the image. For example, the communication device can be programmed to store and encrypt selected image data points for comparison with data from corresponding locations of a questionable image at a later time.

It is noted in FIG. 8 that the device can also perform other operations such as compressing or expanding files, and parsing files and converting them to different formats.

The specific items listed in FIGS. 7 and 8, and discussed above concerning programming of the communication device are all given by way of example. The basic objective of the present invention is to provide a communication device that will allow a digital camera to be connected to one or more types of communication networks for downloading of data to, and receiving data from a remote destination, which is typically a computer. Details of the circuitry and programming of the communication device do not need to be described in this disclosure because those skilled in the art of digital apparatus will understand how to design the device to perform the operations disclosed and claimed herein.

The embodiments of the present invention illustrated above are preferred embodiments. The communication device is particularly useful in these forms in that it allows existing digital cameras that do not have the functionality to connect to a network, to be connected to any of a variety of communication. networks for transmission of image data and receiving instructions. Existing digital cameras do not have to be modified to function with the communication device of the present invention because an interconnection is made through an existing camera port using the existing protocol.

An alternate embodiment of the present invention is illustrated in FIG. 9 wherein a communication device 180 is integrated inside a digital camera 182 containing a digital camera section 184. The novel digital camera 182 can send and receive data to and from a communication network. The camera 182 in this embodiment has a serial port 186 for connection to a line 188 to a PC for receiving programming data, for use in a downloading image data directly to a PC, as in a conventional digital camera. The camera 182 also has one or more communication ports 190 for connection to one or more lines 192 to a communication network. The network communication options discussed for example in reference to FIGS. 4 and 5 also apply to the device 180 of FIG. 9. The operation of the device portion 180, and various features such as the display, indicators, etc. are the same as discussed above in regard to the external communication devices such as 10 or 124. Port 190 is for acceptance of a Smart card 36. Other optional features are not repeated in FIG. 9 for simplicity and to avoid redundant discussion.

FIG. 10 illustrates an embodiment of the invention wherein a communication device 192 is configured for connecting data from a camera 194 directly to a video/TV receiver 196. This connectivity allows both preview of live images from the camera as well as post-view or playback of either still images, or video when applicable.

FIGS. 11 and 12 illustrate communication devices that are configured for transmission to separate destinations. FIG. 11 illustrates a case where the camera 198 is capable of outputting first and second sets of data on lines 200 and 202 respectively, to a communication device 204, and wherein it is desirable to send a first set of data to a first destination 206 and a second set of data to a second destination 208. For example, a journalist may want to send high resolution data to his private PC at destination 206 and send low resolution data to a potential customer for preview at destination 208 prior to placing a purchase order for the image.

Other applications include "escrow" security transmissions where images "first data" are sent to a first location 206, and other information "second data" is automatically sent to a second location/recipient 208. In the case of secured images, an authenticated image can be sent to a first location such as 206 and an image signature and/or authentication data can be sent to a second location 208. Similarly, encrypted or watermarked data can be sent to a first location, and original data to a second location.

In the case where the camera cannot provide both the first and second data, the second data can be prepared by the communication device, as illustrated in FIG. 12. In this case, the camera 210 only outputs original image data. The communication device 212 is programmed to create encrypted image data and/or authentication data, or include other data, and then output first selected data to a first destination/location 206 and a second set of data to location/destination 208.

As referred to in the above description, the device of the present invention performs operations in an automated manner. Novel methods of operation of the communication device and/or integrated camera device will now be described in greater detail.

The communication devices described above, used in a system, for example the system described in FIG. 1 wherein a programmable communication device 10 interconnects a camera 12 with a destination 18, or a similar system with a communication device integrated with a camera as described in reference to FIG. 9, provide a structure capable of automatic and intelligent operation. The computerized destination 18 can be of various configurations, including a single PC or a network server.

The method and apparatus of the present invention in automatic operation has great utility when a plurality of communication devices, either as separate devices or integrated with a camera, are in service and attempts are made to download image data. Image data requires a large memory, and downloading from a number of communication devices is time consuming. Networks encountering such a load of image data can easily be overloaded, requiring either large increases in network band width, or a method of organizing the downloading in an automated manner. Such automation is a particularly useful feature of an embodiment of the present invention and is illustrated in FIG. 13 where three sets of cameras 214, 216, and 218 and communication devices 220, 222, and 224 are connected to a single destination 226 through a network 228.

Various ways of automating the transfer of image data from the cameras to the destination will be understood by those skilled in the art of automation after reading the description of the invention. A preferred embodiment involves programming the devices 220, 222, and 224 to automatically "re-dial" for a hook-up with the destination when a busy signal is received. The destination simply accepts a first call and ignores subsequent calls until the processing of the first call is complete. An alternate method includes the destination storing the numbers of the calling communication devices in the order received, and then notifying the next device in line when the destination is ready for accepting the next download. This approach has an advantage over the re-dialing approach in guaranteeing each device its priority.

Referring now to FIG. 14, an example is illustrated wherein a communication device is programmed to perform automatic operations. Block 230 (set up device) represents the programming that is accomplished through use of a PC 14, Smart card 36, or the computer/destination 18 through a network 16. FIG. 14 is a simplified example of programmed decisions made by a communication device. Details of programming for such operations are well understood by those skilled in the art and therefore are not described in detail.

The example of FIG. 14 illustrates the communication device, for example device 10, programmed to query the camera communication port 20 to determine if a camera is connected. The communication device, for example, can be programmed to check for a camera connection (block 232) at periodic intervals, or at certain times of the day. If the camera is connected, the communication device can then receive and evaluate data from the camera, an operation which can be fully automatic if the camera is programmed to receive and respond to commands through line 22. If not, a user can manually trigger the camera 12 to download the data to the communication device. In either the case of automatic or manual download to the communication device, block 234 represents this function. Block 236 indicates an option for a compatible camera 12, wherein the communication device queries the camera to determine what percentage of the image storage capacity is filled. If it exceeds a certain predetermined amount, for example 75%, the communication device responds by instructing the camera 12 to download the image data (block 234). If not, the device can continue to check for a camera connection and image memory available on a periodic basis, and/or at certain times.

Once image data is loaded, the communication device can respond to programming to perform any of a variety of operations as discussed above, such as encrypting, creating authentication data and relegating selected data for subsequent transmission to one or more destinations. This is indicated simply as block 238.

The communication device can be programmed to send the relegated data at certain times. This programming is symbolically indicated by block 240, and at the programmed time the device checks the output port 30 (FIG. 1) to determine if a connection is made to a network (block 242). If so, the communication device further checks to determine if the destination is connected and ready. This is indicated by block 244 for a single destination and by blocks 246 and 248 for two separate destinations, although any number of destinations are within the scope of the present invention.

Once the communication device determines that the destination is ready, the data is transmitted as indicated by blocks 250, 252 and 254. Block 250 also indicates an option indicating programming of the communication device to include a unique ID with the transmitted data to connect the data to a specific location, i.e. database, within the destination. The purpose of FIG. 14 is primarily to illustrate automation within the communication devices of the present invention. Automation is also possible in the destination 18, and in the camera 12 in those cases where the camera 12 is programmable.

FIG. 15 will now be used to discuss automation within the destination 18. It should also be understood that the present invention includes combinations in which automation occurs in the communication device, camera and destination, or in any combination of the three to accomplish required programming objectives.

Block 258 of FIG. 15 symbolizes programming of the destination 18 to perform operations, examples of which will be described in reference to the various blocks of FIG. 15. Block 260 indicates the destination determining if the communication device is connected to the network. The destination can be programmed to check for a connection at various intervals or times of day, etc. The destination can also be programmed to respond to a signal from the communication device indicating a requirement to transmit data. Both of these options, either an active query to the communication device or a response from the communication device are included in the step indicated by block 260.

Once connection is established between the destination and the communication device, the destination can send instructions to the communication device as indicated by block 262. As with block 260, this action by the destination can be self initiated or in response to an instruction received from the communication device to send data. The data is then received by the destination (block 264) and processed (block 266). The communication device can be either separate from the camera or integrated with it.

FIG. 16 lists examples of data that can be sent by a destination to a communication device including instructions to the communication device to direct the camera to take a picture at a set time or at certain intervals. Account identification, titles or other information can be sent for inclusion in an image header, or for watermarking, etc. Operational data can be sent to inform the user when and where to take a picture. A map showing where to take a picture can be sent, for example, which can be displayed by the user on a camera visual display, and corrective notices can be sent informing the user of any problems with the downloaded image data such as chronic underexposure, focus problems, etc. The destination can also send instructions to the communication device to check camera memory, download data, encrypt data, etc., all controlled by the destination.

Upon receiving data from the communication device (block 264), the destination can automatically process the data according to specific programmed objectives (block 266). A number of possibilities are included in FIG. 16 under "Data Processing by Destination". In cases where data is received in unencrypted form, it can encrypt and store the data, or it can decrypt encrypted data and print images automatically or archive them. The destination 18 can also automatically distribute selected data items to other remote locations, such as on the web, or e-mail at a low resolution image for inspection prior to a sale. The destination can also store authentication data of an original image and create corresponding authentication data from a questionable image, and compare the two sets of authentication data to determine the validity of the questionable image.

In summary of the automatic features of the invention, the destination, for example a server, can call the communication device to notify it of a particular time to send data to a server, for example based on local and remote network load, server processing load, server storage capacity, fulfillment (printing), system load, and other factors. As explained above, there may be querying/handshaking between the communication device and the server to determine if there are sufficient images to send, i.e. to determine the space available in the image storage memory of the communication device or camera-device. Alternatively, the communication device can query the destination to initiate the sending of data.

Another automatic feature of the present invention is the automatic inclusion of prescribed information along with image data, such information including for example, a unique ID, date, time, etc. Closely related to the information included with an image is a phone number or network IP received by the device or camera for automatic dialing to a destination. The communication device can also automatically receive images and related information by querying the destination at preprogrammed times/intervals. Another automatic feature includes automatic downloading based on priority when some users have priority over others.

FIG. 17 applies to the integrated camera-device of FIG. 9. The camera-device is first programmed as indicated by block 268. A picture is taken (block 270), and the programmed operations are performed (block 272). The camera-device can then check memory to determine if data should be downloaded (block 274). If memory space is low, the camera-device will check for a network connection (block 276) and alternatively also display a notice to the user of low storage capacity available (block 278). Once a connection is made to the network, the data is downloaded (block 280). In general, all of the features discussed relative to the communication device 10 apply also to the camera 182 with an integrated communication device 180 as illustrated in FIG. 9, except for those comments that refer to the external connection between the camera and the communications device.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A communication device comprising:

(a) camera communication apparatus for sending data to a digital camera and for receiving data from said digital camera;

(a) network communication apparatus for sending and receiving data through a network, to and from a destination device; and (b) apparatus for automatically initiating the performance of a programmed operation at a specific time pre-programmed into said communication device, said operation comprising uploading data including a camera ID and account number to said destination device, and wherein said communication device does not include a display or a keyboard.

2. A communication device as recited in claim 1, wherein said operation further includes downloading said camera ID and account number upon initiation of a pre-programmed operation.

3. A communication device as recited in claim 1, further comprising a ROM programmed to restrict downloading to a specific destination.

* * * * *